United States Patent
Doumaux et al.

(10) Patent No.: US 11,235,587 B2
(45) Date of Patent: Feb. 1, 2022

(54) INKJET PRE-TREATMENT FLUID FOR DYE SUBLIMATION PRINTING

(71) Applicant: Hewlett-Packard Development Company, L.P., Spring, TX (US)

(72) Inventors: Howard Doumaux, San Diego, CA (US); Ronald Albert Askeland, San Diego, CA (US); Raffaella Fior, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,902

(22) PCT Filed: Nov. 8, 2017

(86) PCT No.: PCT/US2017/060686
§ 371 (c)(1),
(2) Date: Mar. 19, 2020

(87) PCT Pub. No.: WO2019/094008
PCT Pub. Date: May 16, 2019

(65) Prior Publication Data
US 2020/0224051 A1    Jul. 16, 2020

(51) Int. Cl.
*B41J 2/21* (2006.01)
*B41M 5/00* (2006.01)
(Continued)

(52) U.S. Cl.
CPC ........... *B41J 2/2114* (2013.01); *B41J 2/2107* (2013.01); *B41M 5/0011* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,689,078 A    8/1987 Koike et al.
7,669,997 B2   3/2010 Morimoto
(Continued)

FOREIGN PATENT DOCUMENTS

CN   101709548   5/2010
JP   S61118477   6/1986
(Continued)

OTHER PUBLICATIONS

Database WPI Week 200601; Thomson Scientific, London, GB; AN 2006-003008, XP082799794.
(Continued)

*Primary Examiner* — Manish S Shah
(74) *Attorney, Agent, or Firm* — Dierker & Kavanaugh PC

(57) ABSTRACT

An example of an inkjet pre-treatment fluid for dye sublimation printing consists of a humectant; a cationic polymer; a surfactant; a co-solvent present in an amount up to about 50 wt % based on a total weight of the inkjet pre-treatment fluid; and a balance of water. In an example of a printing method, the inkjet pre-treatment fluid is inkjet printed onto a textile substrate to form a pre-treated area on the textile substrate.

17 Claims, 5 Drawing Sheets

(51) Int. Cl.
| | |
|---|---|
| *C09D 11/102* | (2014.01) |
| *C09D 11/328* | (2014.01) |
| *C09D 11/38* | (2014.01) |
| *C09D 11/54* | (2014.01) |
| *D06P 1/16* | (2006.01) |
| *D06P 5/00* | (2006.01) |
| *D06P 5/28* | (2006.01) |
| *D06P 5/30* | (2006.01) |
| *D06P 3/26* | (2006.01) |
| *D06P 3/54* | (2006.01) |
| *D06P 3/82* | (2006.01) |

(52) U.S. Cl.
CPC .......... *C09D 11/102* (2013.01); *C09D 11/328* (2013.01); *C09D 11/38* (2013.01); *C09D 11/54* (2013.01); *D06P 1/16* (2013.01); *D06P 5/002* (2013.01); *D06P 5/005* (2013.01); *D06P 5/006* (2013.01); *D06P 5/30* (2013.01); *D06P 3/26* (2013.01); *D06P 3/54* (2013.01); *D06P 3/8276* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 8,485,657 | B2 | 7/2013 | Pinto et al. |
| 9,109,327 | B2 | 8/2015 | Mizutaki |
| 9,340,695 | B2 | 5/2016 | Oura et al. |
| 9,644,315 | B2 | 5/2017 | Kitagawa et al. |
| 2003/0081028 | A1 | 5/2003 | Feinn |
| 2007/0103529 | A1* | 5/2007 | Pearl ................... D06P 1/65125 347/101 |
| 2010/0231671 | A1* | 9/2010 | Anton ................... C09D 11/40 347/101 |
| 2011/0249058 | A1* | 10/2011 | Shibata ................ C09D 11/322 347/21 |
| 2013/0027451 | A1* | 1/2013 | Li ........................ C09D 11/54 347/9 |
| 2013/0155160 | A1* | 6/2013 | Shiono ................ C09D 11/322 347/100 |
| 2014/0118449 | A1* | 5/2014 | Sarkisian ............... C09D 11/40 347/101 |
| 2015/0275007 | A1* | 10/2015 | Cagle .................... C09D 11/54 347/21 |
| 2015/0275012 | A1 | 10/2015 | Ikeda |
| 2015/0299948 | A1* | 10/2015 | Pan ..................... B41M 5/0017 524/591 |
| 2016/0208435 | A1 | 7/2016 | Oguchi |
| 2017/0136782 | A1 | 5/2017 | Yatake |

FOREIGN PATENT DOCUMENTS

| | | |
|---|---|---|
| JP | 2005320663 | 11/2005 |
| JP | 2006152454 | 6/2006 |
| JP | 2008223193 | 9/2008 |
| WO | WO-2014042652 A1 | 3/2014 |
| WO | WO-2015094564 | 6/2015 |
| WO | WO-2016025319 A1 | 2/2016 |
| WO | WO-2016068983 | 5/2016 |

OTHER PUBLICATIONS

Database WPI; Week 200645; Thomson Scientific, London, GB; AN 2006-436541, XP882799795.

Bhosale, N., et al. "Intelligent Pretreatment: Systems for Digital Textile Printing", 2014, 3pgs, http://texnote.blogspot.in/2014/06/intelligent-pretreatment-systems-for.html.

Provost, John, "Pretreatment of the fabric—A key to successful textile digital printing" TIB Leibniz Information Centre for Science & Technology, 2013, 2 pages, www.tib.eu.

\* cited by examiner

100 ⇘

┌─ 102
Inkjet Printing, from an Inkjet Printhead, a Colorless Inkjet Pre-Treatment Fluid onto a Textile Substrate to Form a Pre-Treated Area on the Textile Substrate, the Colorless Inkjet Pre-Treatment Fluid Including:
  a Humectant;
  a Cationic Polymer;
  a Surfactant;
  a Co-Solvent Present in an Amount Up to about 50 wt% Based On a Total Weight of the Inkjet Pre-Treatment Fluid; and
  a Balance of Water

↓

┌─ 104
Thermal Ink jet Printing, From a Thermal Inkjet Printhead, a Dye Sublimation Ink onto the Pre-Treated Area to Form an Ink Layer on the Textile Substrate, the Dye Sublimation Ink Including:
  a Disperse Dye Colorant Dispersion Present in an Amount Ranging from about 1 wt% Actives to about 7 wt% Actives Based on a Total Weight of the Dye Sublimation Ink;
  a Co-Solvent System Present in a Total Amount Ranging from about 12 wt% to about 25 wt% Based on the Total Weight of the Ink, the Co-Solvent System Consisting of:
    Glycerol Present in an Amount Ranging from about 9 wt% to about 20 wt% Based on the Total Weight of the Ink;
    Ethoxylated Glycerol Present in a Amount Ranging from 0 wt% to about 5 wt% Based on the Total Weight of the Ink; and
    a Water Soluble or Water Miscible Organic Solvent Present in an Amount Ranging from 0 wt% to about 7 wt% Based on the Total Weight of the Ink;
  an Additive Selected from the Group Consisting of a Surfactant, a Chelating Agent, a Buffer, a Biocide, and Combinations thereof; and
  a Balance of Water

↓

Drying the Ink Layer on the Textile Substrate ─ 106

↓

Exposing the Dried Ink Layer on the Textile Substrate to a Post-Treatment Process Involving at least Heat to Form an Image on the Textile Substrate ─ 108

*Fig-1*

Comparative Example: No Pre-Treatment Fluid

Example: Pre-Treatment Fluid

INKJET PRE-TREATMENT FLUID FOR DYE SUBLIMATION PRINTING

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers, and in particular piezoelectric inkjet printers, are gaining rapid acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a flow diagram illustrating an example of a printing method;

DETAILED DESCRIPTION

Figure 2:
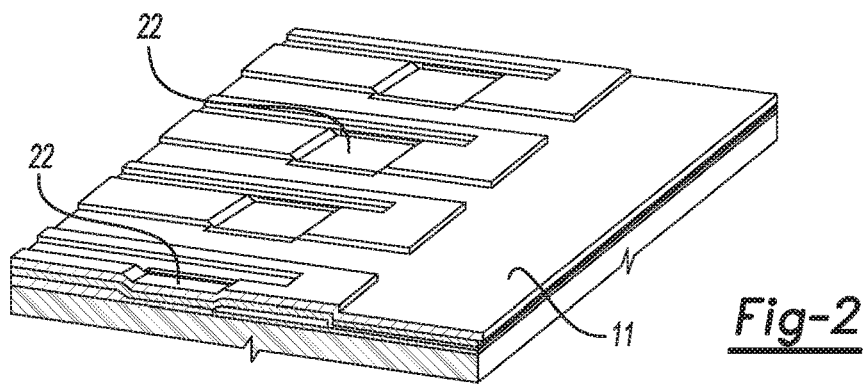
FIG. 2 is a partially cross-sectioned perspective semi-schematic illustration showing an example of heating resistors of an example thermal inkjet printhead.

Examples of the pre-treatment fluid disclosed herein can be applied digitally, via a thermal inkjet printer or a piezoelectric inkjet printer in order to prepare a textile substrate for the subsequent direct application of a dye sublimation ink. The pre-treatment fluid may be applied digitally, which avoids the use of spray nozzles, roll-coating, cylindrical pad printing, or other analog techniques. It has unexpectedly been found that the pre-treatment fluid can be used to treat the textile substrate without causing a yellowing effect. It has also been found that the pre-treatment fluid disclosed herein improves the image quality of the resulting print, e.g., in terms of reduced bleed and wicking, higher color gamut for reflected light, and improved chroma (e.g., when compared to prints formed on similar textile substrates without the pre-treatment fluid disclosed herein).

An example of the inkjet pre-treatment fluid for dye sublimation printing consists of a humectant; a cationic polymer; a surfactant; a co-solvent present in an amount up to about 50 wt % based on a total weight of the inkjet pre-treatment fluid; and a balance of water.

The humectant may be any humectant that does not substantially dissolve the disperse dye that is present in the dye sublimation ink that is to be printed on the pre-treated area formed using the pre-treatment fluid. This prevents the disperse dye from being dissolved into the pre-treated area. The humectant may also be substantially non-volatile, i.e., has a boiling point in excess of 150° C. and has an affinity for water), as this property may improve decap performance of the pre-treatment fluid.

Examples of suitable humectants for the inkjet pre-treatment fluid may be selected from the group consisting of glycerol, ethoxylated glycerol, 2-methyl-1,3-propanediol, 1,2-propanediol, dipropylene glycol, and combinations thereof. Other suitable examples include polyhydric alcohols or simple carbohydrates (e.g., trehalose). Whether used alone or in combination, the total amount of the humectant(s) may be present in the inkjet pre-treatment fluid in an amount ranging from about 12 wt % to about 20 wt % based on a total weight of the inkjet pre-treatment fluid. The humectant amount may be increased to increase the viscosity of the pre-treatment fluid for a high viscosity piezoelectric printhead.

The pre-treatment fluid may also include a co-solvent. Examples of the pre-treatment co-solvent(s) may include alcohols (e.g., diols, such as 1,2-propanediol, 1,3-propanediol, etc.), ketones, ketoalcohols, ethers (e.g., the cyclic ether tetrahydrofuran (THF), and others, such as thiodiglycol, sulfolane, 2-pyrrolidone, 1-(2-hydroxyethyl-2-pyrrolidone,1,3-dimethyl-2-imidazolidinone and caprolactam; glycols such as ethylene glycol, diethylene glycol, tritriethylene glycol, tetraethylene glycol, propylene glycol, dipropylene glycol, tripropylene glycol, trimethylene glycol, butylene glycol, and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; and lower dialkyl ethers of polyhydric alcohols, such as diethylene glycol dimethyl or diethyl ether. The co-solvent amount may range from 0 wt % up to about 50 wt % of a total weight of the inkjet pre-treatment fluid. In another example, the co-solvent amount may range from 10 wt % up to about 30 wt % of a total weight of the inkjet pre-treatment fluid. In some instances, the pre-treatment fluid includes the co-solvent in an amount that is up to two times more than the amount of co-solvent present in the dye sublimation ink that is to be printed with the inkjet pre-treatment fluid.

It is to be understood that water is not considered a solvent or co-solvent, but rather is present in addition to the humectant(s) and makes up a balance of the inkjet pre-treatment fluid. As such, the weight percentage of the water present in the inkjet pre-treatment fluid will depend, in part, upon the weight percentages of the other components. The water may be purified or deionized water.

The inkjet pre-treatment fluid also includes a cationic polymer. Examples of the cationic polymer include polyamines, poly quaternium compounds, polyallylamine, polyallylamine sulfate, polyallylamine hydrochloride, allylamine/diallylamine copolymer, allylamine/diallylamine copolymer sulfate, allylamine/diallylamine copolymer hydrochloride, allylamine/dimethylallylamine, allylamine/dimethylallylamine copolymer sulfate, allylamine/dimethylallylamine copolymer hydrochloride, diallylamine, diallylamine sulfate, diallylamine hydrochloride, methyldiallylamine amide, methyldiallylamine amide sulfate, methyldiallylamine amide hydrochloride, diallylamine sulfur dioxide copolymer, diallylamine sulfur dioxide copolymer sulfate, diallylamine sulfur dioxide copolymer hydrochloride, methyl diallylamine sulfur dioxide copolymer, methyldiallylamine sulfur dioxide copolymer sulfate, methyldiallylamine sulfur dioxide copolymer hydrochloride, polyguanadine, polyethyleneimine, and combinations thereof. Some examples of suitable cationic polymers include cationic linear and structured poly quaternary amines. The cationic polymers are capable of aggregating the disperse dyes in the dye sublimation inks by acting on anionic groups (e.g., carboxyl groups, sulfate groups, naphthalene sulfonic acid-formalin groups, lignosulfonic acid-formalin groups, etc.) present on the surface of the disperse dye or on a dispersant polymer in the dye sublimation ink to prevent the ink from permeating into the textile substrate. As a result, the dye sublimation ink remains on the surface of the textile substrate to improve the color-developing property. The cationic polymer may be present in the inkjet pre-treatment fluid in an amount ranging from about 1 wt % actives to about 5 wt % actives based on the total weight of the inkjet pre-treatment fluid.

Throughout this disclosure, a weight percentage that is referred to as "wt % actives" refers to the loading of an active component of a dispersion or other formulation that is present in the inkjet pre-treatment fluid or the thermal inkjet dye sublimation ink. For example, the wt % actives of the cationic polymer accounts for the loading (as a weight percent) of the active polymer solids present in the inkjet pre-treatment fluid and does not account for the weight of the other components (e.g., water, etc.) of a polymer dispersion (which includes the cationic polymer) in the inkjet pre-treatment fluid. The term "wt %," without the term actives, refers to the loading of a 100% active component that does not include other non-active components therein.

Examples of the inkjet pre-treatment fluid further include a surfactant. The surfactant may be any surfactant that aids in wetting, but that does not deleteriously interact with the cationic polymer. As such, in an example, the surfactant in the inkjet pre-treatment fluid is selected from the group consisting of a non-ionic surfactant, a cationic surfactant, and a zwitterionic surfactant. The amount of the surfactant that may be present in the inkjet pre-treatment fluid is 2 wt % or less (with the lower limit being above 0) based on the total weight of the inkjet pre-treatment fluid. In some examples, the amount of the surfactant ranges from about 0.1 wt % to about 1 wt % based on the total weight of the inkjet pre-treatment fluid.

Examples of suitable non-ionic surfactants include non-ionic fluorosurfactants, non-ionic acetylenic diol surfactants, non-ionic ethoxylated alcohol surfactants, and combinations thereof. Several commercially available non-ionic surfactants that can be used in the formulation of the inkjet pre-treatment fluid include ethoxylated alcohols/secondary alcohol ethoxylates such as those from the TERGITOL® series (e.g., TERGITOL® 15-S-30, TERGITOL® 15-S-9, TERGITOL® 15-S-7), manufactured by Dow Chemical; surfactants from the SURFYNOL® series (e.g., SURFYNOL® 440 and SURFYNOL® 465 (i.e., ethoxylated 2,4,7, 9-tetramethyl 5 decyn-4,7-diol)) manufactured by Evonik Industries, and the DYNOL™ series (e.g., DYNOL™ 607 and DYNOL™ 604) manufactured by Air Products and Chemicals, Inc.; fluorinated surfactants, such as those from the ZONYL® family (e.g., ZONYL® FSO and ZONYL® FSN surfactants), manufactured by E.I. DuPont de Nemours and Company; alkoxylated surfactants such as TEGO® Wet 510 manufactured from Evonik; fluorinated POLYFOX® non-ionic surfactants (e.g., PF159 nonionic surfactants), manufactured by Omnova; or combinations thereof.

Examples of suitable cationic surfactants that may be used in the inkjet pre-treatment fluid include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

Examples of suitable zwitterionic (amphoteric) surfactants that may be used in the inkjet pre-treatment fluid include coco-betaine, alkyl isothionates, N,N-dimethyl-N-dodecylamine oxide, N,N-dimethyl-N-tetradecyl amine oxide (i.e., myristamine oxide), N,N-dimethyl-N-hexadecyl amine oxide, N,N-dimethyl-N-octadecyl amine oxide, N,N-dimethyl-N—(Z-9-octadecenyl)-N-amine oxide, N-dodecyl-N,N-dimethyl glycine, lecithins, phospatidylethanolamine, phosphatidylcholine, and phosphatidylserine.

The inkjet pre-treatment fluid does not include any colorant.

In an example of the inkjet pre-treatment fluid, the humectant is present in an amount ranging from about 12 wt % to about 20 wt % based on a total weight of the inkjet pre-treatment fluid; the cationic polymer is present in an amount ranging from about 2 wt % to about 3 wt % based on the total weight of the thermal inkjet pre-treatment fluid; and the surfactant is present in an amount ranging from about 0.5 wt % to about 1 wt % based on the total weight of the thermal inkjet pre-treatment fluid As mentioned above, the inkjet pre-treatment fluid consists of the listed components and no additional components (such as water soluble polymers, water repellent agents, etc.). In other examples, the inkjet pre-treatment fluid comprises the listed components, and other components that do not deleteriously affect the jettability of the fluid via a thermal or piezoelectric inkjet printhead may be added.

The inkjet pre-treatment fluid disclosed herein may be used in a thermal inkjet printer or in a piezoelectric printer to pre-treat a textile substrate. The viscosity of the pre-treatment fluid may be adjusted for the type of printhead that is to be used, and the viscosity may be adjusted by adjusting the humectant level and/or adding a viscosity modifier. When used in a thermal inkjet printer, the viscosity of the pre-treatment fluid may be modified to range from about 3 cp to about 5 cp (at 20° C. to 25° C.), and when used in a piezoelectric printer, the viscosity of the pre-treatment fluid may be modified to range from about 2 cp to about 12 cp (at 20° C. to 25° C.), depending on the viscosity of the printhead that is being used (e.g., low viscosity printheads, medium viscosity printheads, or high viscosity printheads).

The inkjet pre-treatment fluid may be directly applied to a textile fabric prior to the application of a dye sublimation ink. Examples of suitable dye sublimation inks that may be used with the inkjet pre-treatment fluid will now be described.

An example of the thermal inkjet dye sublimation ink disclosed herein includes a disperse dye colorant dispersion; a co-solvent system consisting of glycerol present in an amount ranging from about 9 wt % to about 20 wt % based on the total weight of the ink, ethoxylated glycerol present in an amount ranging from 0 wt % to about 5 wt % based on the total weight of the ink, and a water soluble or water miscible organic solvent present in an amount ranging from 0 wt % to about 7 wt % based on the total weight of the ink; an additive; and a balance of water. In some examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the ink via a thermal inkjet ink may be added.

In the examples disclosed herein, the disperse dye colorant dispersion may be any color. In an example, the disperse dye colorant dispersion is selected from the group consisting of a black disperse dye colorant dispersion, a cyan disperse dye colorant dispersion, a magenta disperse dye colorant dispersion, and a yellow disperse dye colorant dispersion. Each disperse dye colorant dispersion includes a disperse dye, a dispersant, and a dispersion vehicle.

The disperse dye included in the colorant dispersion may depend on the desired color for the thermal inkjet dye sublimation ink.

Black disperse dye colorant dispersions often include a blend of disperse dyes, such as, for example, blends of blue, brown and yellow disperse dyes, or blends of blue, orange and violet disperse dyes, or blends of blue, orange and yellow disperse dyes, or blue, magenta, and yellow dyes. An example of a suitable blue, brown and yellow disperse dye blend include disperse blue 360 (DB360), disperse brown 27, and disperse yellow 54 (DY54). Some examples of suitable blue, orange and violet disperse dye blends include disperse blue 291:1 (DB291:1), disperse orange 29 (D029) and disperse violet 63, or DB291:1, D029 and disperse violet 99. An example of a suitable blue, orange and yellow dye blend includes DB360, disperse orange 25, and DY54. An example of a suitable blue, magenta, and yellow dye blend includes disperse blue 77 (DB77), disperse red 92, and disperse yellow 114 (DY 114).

Cyan disperse dye colorant dispersions may include blue disperse dyes, such as disperse blue 27, disperse blue 60, disperse blue 73, DB77, disperse blue 87, disperse blue 257, DB291:1, disperse blue 359, DB360, disperse blue 367, and mixtures thereof.

Magenta disperse dye colorant dispersions may include red disperse dyes, such as disperse red 60, disperse red 82, disperse red 86, disperse red 86:1, disperse red 167:1, disperse red 279, and mixtures thereof.

Yellow disperse dye colorant dispersions may include yellow disperse dyes, such as DY54, disperse yellow 64, disperse yellow 71, disperse yellow 86, DY114, disperse yellow 153, disperse yellow 233, disperse yellow 245, and mixtures thereof.

The disperse dye colorant dispersion may include from about 10 wt % dye solids to about 20 wt % dye solids based on the total weight of the colorant dispersion.

As mentioned above, each disperse dye colorant dispersion also includes a dispersant. The dispersant may be any suitable polymeric dispersant that can disperse the dye and that can be jetted via a thermal inkjet printhead.

Some examples of the polymeric dispersant (which may also be anionic or non-ionic) include polymers or copolymers of acrylics, methacrylics, acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylamides, and/or methacrylamides. Some specific examples include a styrene methacrylic acid copolymer, a styrene acrylic acid copolymer, styrene acrylic acid-acrylic ester copolymers, styrene methacrylic acid-acrylic ester copolymers, a styrene maleic anhydride copolymer, polyacrylic acid partial alkyl ester, polyalkylene polyamine, polyacrylates, and vinyl naphthalene-maleic acid copolymers. Another example of a suitable polymeric dispersant is a polyurethane polymer. Still other examples of suitable polymeric dispersants for the disperse dye colorant dispersion include block acrylic copolymers, including A-B block copolymers such as benzyl methacrylate-methacrylic acid diblock copolymers and butyl methacrylate-methacrylic acid diblock copolymers. Still further examples of suitable polymeric dispersants include ABC triblock copolymers, such as benzyl methacrylate-methacrylic acid-ethoxytriethyleneglycol methacrylate triblock copolymers and butyl methacrylate-methacrylic acid-ethoxytriethyleneglycol methacrylate triblock copolymers. Still some other examples of suitable dispersants include low acid value acrylic resins, such as JONCRYL® 586, 671, 675, 678, 680, 683, 690, 693, and 695 (from BASF Corp.).

Examples of polymerization methods used to form the dispersant may include free radical processes, Group Transfer Processes (GTP), radical addition fragmentation (RAFT), atom transfer reaction (ATR), special chain transfer polymerization technology (SCT), and the like. As one example, the dispersant may be a graft acrylic copolymer made by SCT.

In other examples, the disperse dyes may be self-dispersing dyes. The disperse dyes may be exposed to a diazonium treatment (where a charged free radical from a degraded azo attaches to the colorant), or to an ozone treatment (oxidation and functionalization with, e.g., a carboxylic acid), or to a crosslinking treatment to render the dye self-dispersing.

The disperse dye colorant dispersion may include from about 4 wt % dispersant solids to about 7 wt % dispersant solids, based on the total weight of the colorant dispersion.

The mean particle size of the solids (e.g., the disperse dyes and the dispersants) in the disperse dye colorant dispersion may range from about 50 nm to about 100 nm. In another example, the mean particle size of the disperse dye ranges from about 100 nm to about 200 nm. These particle sizes are particularly suitable for being jetted through the orifices of thermal inkjet printheads.

The dispersion vehicle may include water and a water soluble or water miscible co-solvent. Examples of the water soluble or water miscible co-solvent in the disperse dye colorant dispersion may include alcohols (e.g., diols, such as 1,2-propanediol, 1,3-propanediol, etc.), ketones, ketoalcohols, ethers (e.g., the cyclic ether tetrahydrofuran (THF), and others, such as thiodiglycol, sulfolane, 2-pyrrolidone, 1-(2-hydroxyethyl-2-pyrrolidone,1,3-dimethyl-2-imidazolidinone and caprolactam; glycols such as ethylene glycol, diethylene glycol, tritriethylene glycol, tetraethylene glycol, propylene glycol, dipropylene glycol, tripropylene glycol, trimethylene glycol, butylene glycol, and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; and lower dialkyl ethers of polyhydric alcohols, such as diethylene glycol dimethyl or diethyl ether.

One or more of these co-solvents may be present in the disperse dye colorant dispersion in respective amounts ranging from about 1 wt % to about 5 wt %, based on the total weight of the colorant dispersion. The balance of the disperse dye colorant dispersion is water, such as purified water or deionized water.

In an example, the disperse dye colorant dispersion has i) a mean particle size ranging from about 50 nm to about 200 nm, and ii) from about 10 wt % dye solids to about 20 wt % dye solids and from about 4 wt % to about 7 wt % dispersant solids, based on the total weight of the colorant dispersion. In this example, the remainder of the disperse dye colorant dispersion may be co-solvent(s) and water.

To form the thermal inkjet dye sublimation ink disclosed herein, the disperse dye colorant dispersion is incorporated into an ink vehicle, which includes the co-solvent system of glycerol alone or in combination with ethoxylated glycerol and/or the water soluble or water miscible organic solvent, additive(s), and water.

The disperse dye colorant dispersion may be incorporated into the ink vehicle such that from about 1 wt % actives to about 7 wt % actives are present, based on a total weight of the thermal inkjet dye sublimation ink. In another example, the disperse dye colorant dispersion may be present in an amount ranging from about 3 wt % actives to about 5 wt % actives based on the total weight of the thermal inkjet dye sublimation ink. The wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink.

The co-solvent system is present in a total amount ranging from about 12 wt % to about 25 wt % based on the total weight of the ink. The co-solvent system includes glycerol, and in some instances, ethoxylated glycerol.

Glycerol is the primary solvent, in part, because the disperse dye is highly non-soluble in glycerol. Glycerol is also selected, in part, because it also helps to maintain the nozzle health of the thermal inkjet printheads, and to provide substantially consistent print quality over the life of the printhead. The glycerol is present in an amount ranging from about 9 wt % to about 20 wt % based on the total weight of the ink.

Ethoxylated glycerol may also be present in the co-solvent system. In an example, the ethoxylated glycerol is present in an amount ranging from 0 wt % to about 5 wt %. The inclusion of ethoxylated glycerol may improve the turn-on energy curve for the ink, may help the thermal inkjet printhead fire better, and may improve decap performance.

The co-solvent system may also include the water soluble or water miscible organic solvent present in an amount ranging from 0 wt % to about 7 wt % based on the total weight of the ink. In general, the disperse dye in the disperse dye colorant dispersion is more soluble in the water soluble or water miscible organic solvent than in the glycerol, and thus makes up less than 50% of the total solvent content (i.e., glycerol plus any ethoxylated glycerol plus the water soluble or water miscible organic solvent, and not including water) so that the disperse dyes remains dispersed in the ink vehicle. The water soluble or water miscible organic solvent may be added to the ink vehicle or may be included as the co-solvent from the disperse dye colorant dispersion. As such, in an example, at least a portion of the water soluble or water miscible organic solvent in the ink is also present in the disperse dye colorant dispersion (e.g., as the co-solvent of the dispersion). This co-solvent(s) is present in the disperse dye colorant dispersion in relatively low amounts (1 wt % to about 5 wt % based on the total weight of the colorant dispersion), and thus a fraction of the co-solvent(s) is carried over to the ink disclosed herein depending, in part, upon the dispersion solids and the loading of the dispersion in the ink. Examples of the water soluble or water miscible organic solvent that may be present in the co-solvent system are selected from the group consisting of 2-pyrrolidone, propylene glycol, dipropylene glycol, 1,2-hexanediol, 1,2-propanediol, 1,3-propanediol, 2-methyl-1,3-propanediol, tetrahydrofuran, diethylene glycol, and combinations thereof.

In one example of the co-solvent system in the ink, the glycerol is present in an amount of about 12 wt %, and the ethoxylated glycerol is present in an amount of about 4 wt %. In another example of the co-solvent system in the ink, the glycerol is present in an amount of about 9 wt %, and the ethoxylated glycerol is present in an amount of about 3 wt %. In still another example, the co-solvent system in the ink consists of the glycerol present in an amount ranging from about 12 wt % to about 16 wt % based on the total weight of the ink, and the water soluble or water miscible organic solvent.

Examples of the ink disclosed herein may also include additive(s), such as a surfactant, a chelating agent, a buffer, a biocide, and combinations thereof.

In an example, the total amount of surfactant(s) in the thermal inkjet dye sublimation ink ranges from about 0 wt % to about 2 wt % (with respect to the weight of the thermal inkjet dye sublimation ink). In another example, the surfactant is present in an amount of 1 wt % or less. The surfactant(s) may be included in the thermal inkjet dye sublimation ink to aid in jettability, control the viscosity, to improve the lubricity, and to prevent agglomeration of the dispersed dye solids. Examples of suitable surfactants include oleth-3-phosphate, non-ionic, low foaming surfactants, such as ethoxylated 2,4,7,9-tetramethyl 5 decyn-4,7-diol (commercially available as SURFYNOL® 465 (HLB 13) from Evonik Industries) and other ethoxylated surfactants (commercially available as SURFYNOL® 440 (HLB 8) from Evonik Industries), or secondary alcohol ethoxylates (commercially available as TERGITOL® 15-S-7 (HLB 12.1), TERGITOL® 15-S-9 (HLB 12.6), etc. from The Dow Chemical Co.). In an example, the surfactant is oleth-3-phosphate, ethoxylated 2,4,7,9-tetramethyl 5 decyn-4,7-diol, or combinations thereof. In some examples, it has been found that the combination of SURFYNOL® 465 and SURFYNOL® 440 may contribute to the synergistic effects of the inks disclosed herein in terms of wetting.

When oleth-3-phosphate is included, it may be present in an amount ranging from about 0.1 wt % to about 0.75 wt % based on the total weight of the ink. In an example, the oleth-3-phosphate is present in an amount ranging from about 0.2 wt % to about 0.5 wt % based on the total weight of the ink. Oleth-3-phosphate is commercially available as CRODAFOS™ O3A or CRODAFOS™ N-3 acid from Croda. It is believed that the oleth-3-phosphate may aid the chelating agent (when included) in effectively trapping high levels of metal ions present in the ink (e.g., from the colorant dispersion), and that the chelating agent (when included) keeps the oleth-3-phosphate from precipitating out of the ink. This combination leads to a significant and unexpected reduction in kogation in the thermal inkjet printhead. Kogation refers to the deposit of dried ink on a heating element of a thermal inkjet printhead, and the combination of the oleth-3-phosphate with the chelating agent assists in preventing the buildup of kogation and extending the life of the printhead. These synergistic effects are unexpected given the small amount of the two components and the relatively high level of metal ions that may be present (due to the disperse dye colorant dispersion).

The chelating agent is another example of an additive that may be included in the ink. When included, the chelating agent is present in an amount greater than 0 wt % actives and less than 0.1 wt % actives based on the total weight of the ink. In an example, the chelating agent is present in an amount ranging from about 0.04 wt % actives to about 0.08 wt % actives based on the total weight of the ink. The wt % actives of the chelating agent accounts for the loading (as a weight percent) of the active chelator/chelating agent present in the ink, and does not account for the weight of other components of the chelating agent solution (e.g., water) in the inkjet ink.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt ($Na_3MGDA$) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

The surfactant and chelating agent, and their respective amounts, may depend, in part, on the colorant dispersion that is included in the ink. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); and hexamethylenediamine tetra(methylene phosphonic acid), potassium salt, and the surfactant is selected from the group consisting of oleth-3-phosphate, ethoxylated 2,4,7,9-tetramethyl 5 decyn-4,7-diol, and combinations thereof. In another example, the ink is a black ink or a magenta ink, the chelating agent is present in an amount greater than 0 wt % actives and less than 0.1 wt % actives based on the total weight of the ink, and the surfactant is a combination of oleth-3-phosphate and ethoxylated 2,4,7,9-tetramethyl 5 decyn-4,7-diol. In still another example, the ink is a cyan ink or a yellow ink, the chelating agent is present in an amount greater than 0 wt % actives and less than 0.1 wt % actives based on the total weight of the ink, and the surfactant is ethoxylated 2,4,7,9-tetramethyl 5 decyn-4,7-diol.

In an example, the pH of the thermal inkjet dye sublimation ink ranges from about 7 to about 9.5 at the time of manufacture. In another example, the pH of the thermal inkjet dye sublimation ink ranges from about 8 to about 9 at the time of manufacture. pH adjuster(s), such as a buffer, may be added to the ink to counteract any slight pH drop that may occur over time. The pH may drop from about 0.5 units to about 1 unit over time after being manufactured. As such, the pH of the inks disclosed herein may be lower than the ranges set forth herein, depending, in part, upon how much time has passed since manufacture. In an example, the total amount of buffer(s) in the ink ranges from 0 wt % to about 0.5 wt % (with respect to the weight of the thermal inkjet dye sublimation ink). In another example, the total amount of buffer(s) in the ink is about 0.1 wt % (with respect to the weight of the thermal inkjet dye sublimation ink). Examples of some suitable buffers include TRIS (tris(hydroxymethyl) aminomethane or Trizma), bis-tris propane, TES (2-[[2-Hydroxy-1,1-bis(hydroxymethyl)ethyl]amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl-4-aminobutanesulfonic acid), or the like.

In an example, the total amount of biocide(s) in the thermal inkjet dye sublimation ink ranges from about 0 wt % actives to about 0.5 wt % actives (with respect to the weight of the thermal inkjet dye sublimation ink). In another example, the total amount of biocide(s) in the inkjet ink composition is about 0.001 wt % actives to about 0.1 wt % actives (with respect to the weight of the thermal inkjet dye sublimation ink). The wt % actives of the biocide accounts for the loading (as a weight percent) of the active biocidal agent present in the ink, and does not account for the weight of other components of the biocide (e.g., water) in the inkjet ink.

Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

It is to be understood that water is not considered a solvent or co-solvent in the inks disclosed herein, but rather is present in addition to the co-solvent system and makes up a balance of the ink. As such, the weight percentage of the water present in the thermal inkjet dye sublimation inks will depend, in part, upon the weight percentages of the other components. The water may be purified or deionized water.

Referring now to FIG. 1, a printing method 100 involving the inkjet pre-treatment fluid is depicted. The method 100 includes inkjet printing, from an inkjet printhead, a colorless inkjet pre-treatment fluid onto a textile substrate to form a pre-treated area on the textile substrate, the colorless inkjet pre-treatment fluid including: a humectant; a cationic polymer; a surfactant; a co-solvent present in an amount up to about 50 wt % based on a total weight of the inkjet pre-treatment fluid; and a balance of water (as shown at reference numeral 102); thermal inkjet printing, from a thermal inkjet printhead, a dye sublimation ink onto the pre-treated area to form an ink layer on the textile substrate, the dye sublimation ink including: a disperse dye colorant dispersion present in an amount ranging from about 1 wt % actives to about 7 wt % actives based on a total weight of the dye sublimation ink; a co-solvent system present in a total amount ranging from about 12 wt % to about 25 wt % based on the total weight of the ink, the co-solvent system consisting of: glycerol present in an amount ranging from about 9 wt % to about 20 wt % based on the total weight of the ink; ethoxylated glycerol present in an amount ranging from 0 wt % to about 5 wt % based on the total weight of the ink; and a water soluble or water miscible organic solvent present in an amount ranging from 0 wt % to about 7 wt % based on the total weight of the ink; an additive selected from the group consisting of a surfactant, a chelating agent, a buffer, a biocide, and combinations thereof; and a balance of water (as shown at reference numeral 104); drying the ink layer on the textile substrate (as shown at reference numeral 106); and exposing the dried ink layer on the textile substrate to a post-treatment process involving at least heat to form an image on the textile substrate (as shown at reference numeral 108). It is to be understood that any examples of the inkjet pre-treatment fluid disclosed herein may be used as the colorless inkjet pre-treatment fluid of the method 100, and any of the thermal inkjet dye sublimation inks disclosed herein may be used as the dye sublimation ink of the method 100.

The textile substrate may be polyester fabric, a polyester coated surface, blends of polyester and other materials (e.g., cotton, linen, etc.) as long as polyester is present in an amount of at least 50 wt % and is present at or near the surface of the fabric, nylons, or other fabrics. In one example, the polyester blend includes from about 70 wt % to about 80 wt % of the polyester. As one example, the textile substrate is an uncoated polyester, a coated polyester, a polyester blend, or a nylon. Examples of materials that may be coated with polyester include glass, metal, wood, plastics, ceramics, etc.

With direct printing onto the textile substrate, the inkjet pre-treatment fluid is thermally or piezoelectrically inkjetted onto the surface of the textile substrate (reference numeral 102). The inkjet pre-treatment fluid may be jetted onto at least a portion of the textile substrate where an ink layer is to be printed thereon. The inkjet pre-treatment fluid thus forms a pre-treated area on the textile substrate. Since the pre-treatment fluid can be inkjetted as desired in a particular area on the textile substrate, the pre-treatment fluid is not wasted on areas of the textile substrate that are not going to receive the dye sublimation ink. Inkjetting also deposits less fluid on the textile medium (as opposed to analog printing methods), which isolates the pre-treatment fluid at the surface of the fabric and keeps the fibers from being pre-wetted, which can accelerate ink absorption into the textile substrate. Moreover, because the pre-treatment fluid is inkjettable, it can be applied in-line with the dye sublimation ink.

In some examples of the method 100, the dye sublimation ink is then printed on the pre-treated area without first drying the pre-treated area.

In other examples of the method 100, the pre-treated area is exposed to drying before the dye sublimation ink is printed thereon. These examples of the method 100 further include exposing the pre-treated area on the textile substrate to drying to form a dried pre-treated area on the textile substrate, and the dye sublimation ink is printed on the dried pre-treated area to form the ink layer on the textile substrate. Exposing the pre-treated area on the textile substrate to drying may involve a drying temperature ranging from about 40° C. to about 90° C. and a drying time ranging from about 10 seconds to about 120 seconds. Drying the pre-treated area may improve the performance of the pre-treatment fluid, for example, in terms of fixing the disperse dye applied thereon to reduce bleed and improve ink absorption.

Whether the pre-treated area is dried or not, with direct printing onto the textile, the dye sublimation ink is thermally inkjetted onto the (dried) pre-treated area to form an ink layer on the textile substrate (reference numeral 104). A thermal inkjet printhead uses a certain minimum energy to fire ink drops of the proper volume (herein called the turn-on energy). To accommodate various manufacturing tolerances, it may be desirable to deliver more energy to the average printhead than is required to fire it (called "over-energy") in order to allow for any uncertainty. However, it has been found that the inks disclosed herein can be printed at an operating energy that includes a margin over the turn-on energy (TOE) for the printhead, wherein the margin ranges from about 10% to about 25% over the TOE. In an example, the margin is about 15% over the TOE. The low over-energy printing may contribute to the improved performance of the inks disclosed herein.

Once the dye sublimation ink disclosed herein is thermal inkjet printed directly on the (dried) pre-treated area of the textile substrate, the ink layer on the textile substrate may be dried (reference numeral 106). Exposing the ink layer to drying may involve a drying temperature ranging from about 40° C. to about 90° C. and a drying time ranging from about 10 seconds to about 120 seconds.

The dried ink layer may then be exposed to a post-treatment process involving at least heat to form an image on the textile substrate (reference numeral 108). The heat that is applied, or the heat and pressure that are applied is/are sufficient to sublimate the disperse dye so that it converts to a gas and penetrates into the textile. The heat, or heat and pressure may also be sufficient to open up the fibers of the textile substrate and allow the dye to migrate into the fibers. The dye then re-solidifies on the fibers of the textile substrate, which renders the printed image durable, wash-resistant, and colorfast. The heat to initiate sublimation may range from about 182° C. to about 215° C., and the pressure may range from 0 psi to about 100 psi. As such, in one example of the method 100, the post-treatment process involves heating the dried ink layer on the textile substrate to a temperature ranging from about 182° C. to about 215° C., and exposing the dried ink layer on the textile substrate the pressure ranging from 0 psi to about 100 psi.

As mentioned above, the inkjet pre-treatment fluid may be applied via a thermal inkjet printhead or a piezoelectric printhead, and the dye sublimation ink may be applied via a thermal inkjet printhead.

Figure 3:
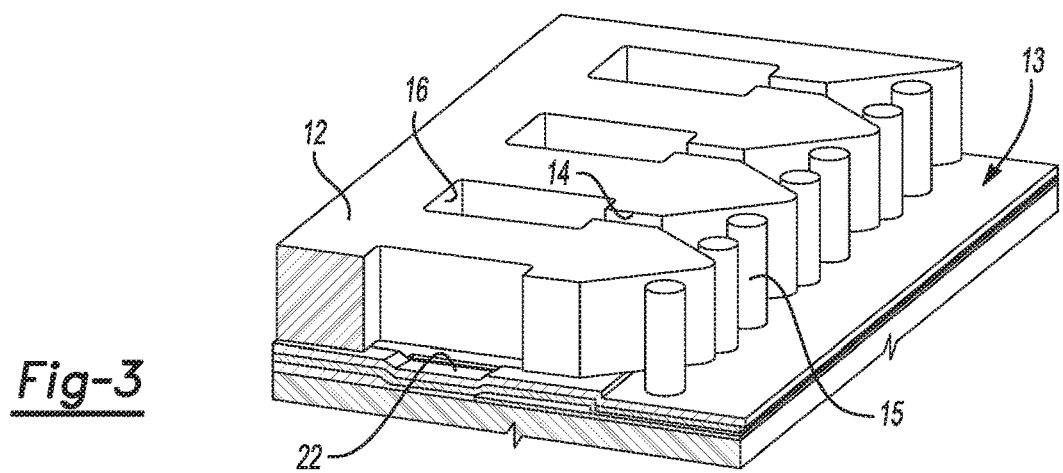
FIG. 3 is a partially cross-sectioned perspective semi-schematic illustration showing an example of ink chambers of an example thermal inkjet printhead.

Referring now to FIGS. 2-5 together, an example inkjet printhead 10 generally includes a base substrate 11 (made, e.g., from silicon or another suitable material). The base substrate 11 may include multiple layers (as shown in FIG. 2) to operatively accommodate suitable electronics to fire printhead nozzles. The printhead 10 further includes a substrate 12 (made, e.g., from a polymeric or other suitable material) defined on the base substrate 11. The substrate 12 has at least one ink/fluid feed opening 14 and at least one ink/fluid chamber/reservoir 16 defined therein. Four ink/fluid feed openings 14 are shown in FIG. 3, though it is to be understood that any desirable number of ink/fluid feed openings 14 may be provided. The ink/fluid feed opening 14 is in operative and fluid communication with an ink/fluid chamber 16 and with an ink/fluid channel 13. In an example, one or more pillars 15 may be positioned between the ink/fluid channel 13 and the ink/fluid feed opening 14 to filter the ink/fluid supply before it enters the ink/fluid chamber 16.

The ink/fluid chamber 16 is generally configured to repeatedly receive ink or the pre-treatment fluid, via ink/fluid feed opening 14 and ink/fluid channel 13, from an ink/pre-treatment fluid supply or source during inkjet printing. In one example, the printhead 10 may be incorporated with an ink or pre-treatment fluid cartridge 26 (see FIG. 5), and the ink/fluid chamber 16 receives the ink or the pre-treatment fluid from one or more ink/fluid supply regions housing, e.g., a volume of free ink or pre-treatment fluid and/or a capillary media configured to store the ink or pre-treatment fluid in individual capillaries. In another example, the printhead 10 may be a separate unit operatively connected (via appropriate tubing or the like) to a remotely located ink or pre-treatment fluid supply. In other words, printheads 10 can be integrated into the ink or pre-treatment fluid cartridge 26 (Integrated Print Head: IPH); or a printhead 10 can be integrated into a printer which has Individual Ink Cartridges (IIC). It is to be understood that other configurations of the inkjet printhead 10 are also contemplated herein.

Figure 4:
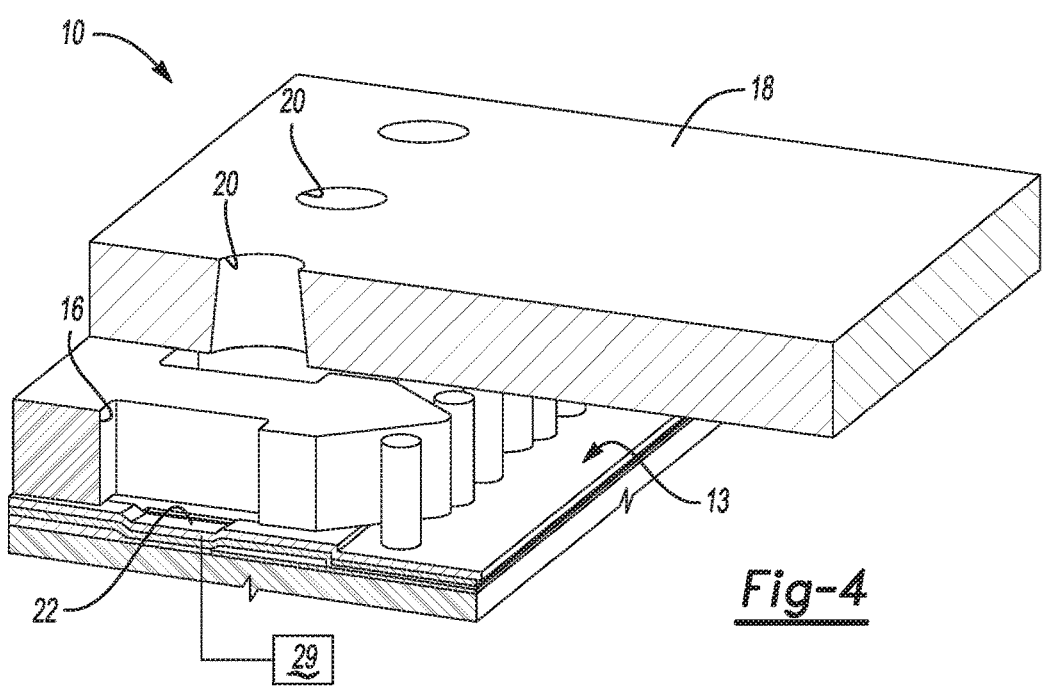
FIG. 4 is a partially cross-sectioned perspective semi-schematic illustration showing an example of a nozzle plate of an example thermal inkjet printhead.

The printhead 10 further includes a nozzle plate 18 disposed on the substrate 12. In an example, the nozzle plate 18 includes a plurality of orifices 20 (three of which are shown in FIG. 4). The orifice 20 is generally in fluid communication with the ink/fluid chamber 16 and is configured to eject an ink or pre-treatment fluid drop therethrough during an ink or pre-treatment fluid ejection process (i.e., the pushing of the ink or pre-treatment out of the printhead 10 through the orifice 20 during inkjet printing).

When the inkjet printhead 10 is a thermal inkjet printhead, a firing element 22 is a heating/firing resistor, and is operatively disposed on the base substrate 11 and proximate to the ink/fluid feed opening(s) 14 and ink/fluid chamber(s) 16. The firing element 22 is also operatively associated with the orifice 20. Although FIG. 4 depicts that the firing element 22 is operatively associated with a single orifice 20, it is to be understood that the firing element 22 may also be operatively associated with a plurality of orifices 20.

In an example of a thermal inkjet printhead, an array of ink/fluid chambers 16 receives liquid ink or pre-treatment fluid from the ink/fluid channel 13. The heating/firing resistor (firing element 22) is located opposite the nozzle/orifice 20 so that ink or pre-treatment fluid can collect between it and the orifice 20. The firing of ink droplets is typically under the control of a microprocessor (not shown), the signals of which are conveyed by electrical traces to the firing elements 22. When electric printing pulses/electrical current is passed through the inkjet firing element 22 (e.g., firing/heating resistor) to heat it to the desired firing temperature, a small portion of the ink or pre-treatment fluid next to it vaporizes and ejects a drop of ink or pre-treatment fluid from the printhead 10.

When the inkjet printhead 10 is a piezoeletric inkjet printhead, the firing element 22 is a piezoelectric ink ejection device. The piezoelectric ink ejection device may eject fluid drops from the orifice 20 using a piezoelectric actuator/element as the firing element. Piezoelectric printing involves mechanical displacement, which causes the pre-treatment fluid to eject.

In an example of a piezoelectric inkjet printhead, an array of fluid chambers 16 receives the pre-treatment fluid from the fluid channel 13. The piezoelectric actuator/element is located opposite the nozzle/orifice 20 so that pre-treatment fluid can collect between it and the orifice 20. The firing of ink droplets is typically under the control of a microprocessor (not shown), the signals of which are conveyed by electrical traces to the piezoelectric actuator/element. When electric printing pulses/electrical current is passed through the firing element 22 (in this example, piezoelectric actuator/element), the piezoelectric actuator/element bends backward (or is otherwise mechanically manipulated), creating a negative pressure or waveform that forces precise amounts of the pre-treatment fluid into the space (firing chamber) between the piezoelectric actuator/element and the orifice 20. When the electric charge is altered, the piezoelectric actuator/element rapidly pushes in the opposite direction, propelling the pre-treatment fluid to eject out from the printhead 10.

Figure 5:
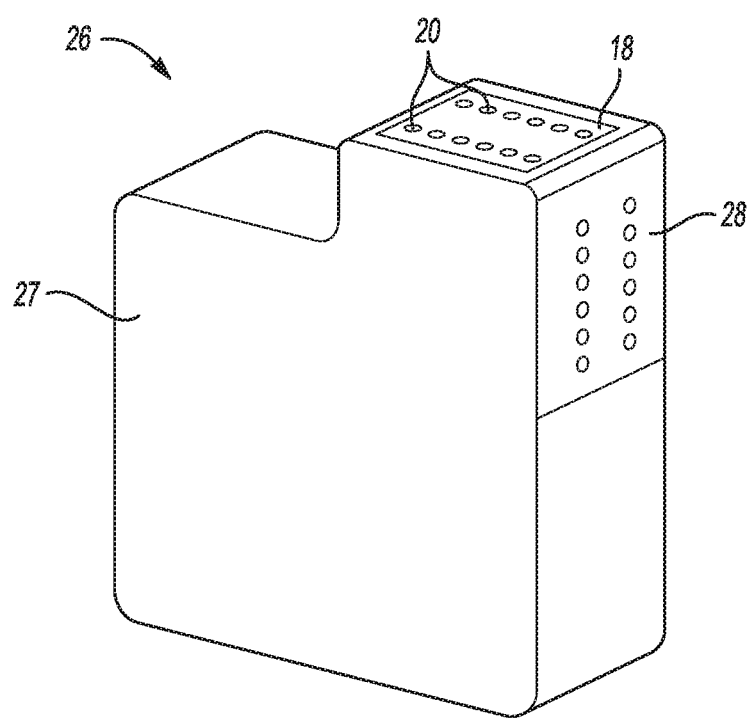
FIG. 5 is a perspective view of an example of a thermal inkjet cartridge.

FIG. 5 is a semi-schematic illustration of an inkjet print cartridge 26 incorporating a printhead 10 according to an example. The inkjet print cartridge 26 includes an internal ink reservoir (not shown) within the cartridge body 27 and a printhead. The body 27 can include the ink/fluid reservoir wholly contained within the cartridge body 27 or, alternatively, can include a chamber inside the cartridge body 27 that is fluidly coupled to one or more off-axis ink reservoirs (not shown).

The printhead includes a nozzle plate 18 including orifices 20 formed in a flexible polymer circuit. The flexible circuit provides for the routing of conductive traces which are connected at one end to electrodes on the substrate and on the other end to contact pads 28. The print cartridge 26 is designed to be installed in a printer so that the contact pads 28 on the front surface of the flexible circuit contact printer electrodes, thereby providing externally generated energization signals to the printhead. In the thermal inkjet printhead, each resistor may act as an ohmic heater when selectively energized by one or more pulses applied sequentially or simultaneously to one or more of the contact pads 28.

It is to be understood that a single printhead 10 may include multiple (e.g., 400 or some other desirable number) firing elements 22 and orifices 20. While not shown, it is to be understood that the printhead 10 includes an integrated circuit that selectively routes signals (e.g., from the microprocessor that is capable of running suitable computer readable instructions) to the desirable firing element(s) 22 and orifice(s) 20 for firing ink drops therefrom to produce images directly on the textile substrate or on a transfer medium.

The print cartridge 26 may be mounted in a carriage of an inkjet printer (not shown). The carriage may move the print cartridge 26 across a print substrate (e.g., the textile substrate) in a print/image zone of the printer. The orifice(s) 20 associated with the resistor or piezoelectric actuator/element may be arranged in one or more linear orifice arrays. The orifice(s) 20 may be aligned parallel to the direction in which the print substrate is moved through the printer and perpendicular to the direction of motion of the resistor or piezoelectric actuator/element with the print cartridge 26. Control of the ejection of the pre-treatment fluid causes a pre-treated area to be formed in a swath across the textile substrate, and control of ejection of the thermal inkjet dye sublimation ink from each orifice 20 causes characters, or other images, to be printed on the pre-treated area in a swath across the textile substrate.

Alternatively, the print cartridge 26 may be a page-wide print cartridge that is in fluid communication with an off-axis ink supply system. The page-wide print cartridge includes a print head bar that extends the entire print/image zone, and thus the page-wide print cartridge is static during a printing operation.

Figure 6:
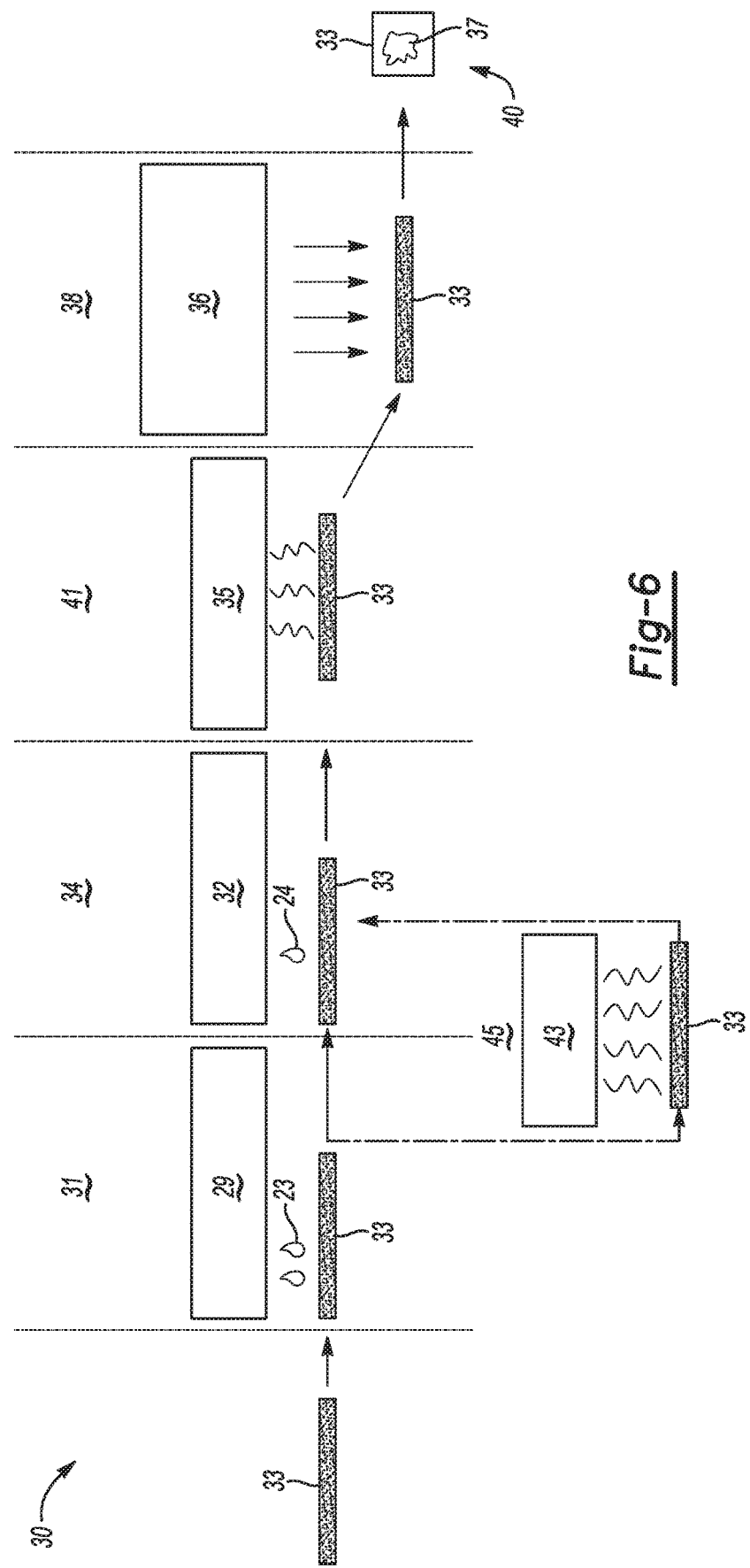
FIG. 6 is a schematic diagram of an example of a printing system.

Referring now to FIG. 6, a schematic diagram of a printing system 30 is depicted. An example of the printing system 30 includes at least two inkjet printheads (e.g., printhead 10), each of the printheads 10 including: a base substrate 11; another substrate 12 defined on the base substrate 11, the other substrate 12 having defined therein at least one fluid feed opening 14 and at least one fluid chamber 16, wherein the at least one fluid feed opening 14 is in operative and fluid communication with the at least one fluid chamber 16 and with a fluid channel 13 to supply a fluid (e.g., pre-treatment fluid 23 or ink 24) thereto; a nozzle plate 18 disposed on a portion of the other substrate 12, the nozzle plate 18 having at least one orifice 20 defined therein, the at least one orifice 20 being in fluid communication with the at least one fluid chamber 16; and a firing element 22 operatively disposed on the base substrate 11 and proximate to, and operatively associated with the at least one fluid chamber 16 and the at least one orifice 20; wherein a first of the a first of the inkjet printheads 10 is a thermal inkjet printhead or a piezoelectric inkjet printhead containing a colorless inkjet pre-treatment fluid 23, including: a humectant, a cationic polymer, a surfactant, a co-solvent present in an amount up to about 50 wt % based on a total weight of the inkjet pre-treatment fluid, and a balance of water; and wherein a second of the inkjet printheads 10 is a thermal inkjet printhead containing a dye sublimation ink 24, including: a disperse dye colorant dispersion present in an amount ranging from about 1 wt % actives to about 7 wt % actives based on a total weight of the dye sublimation ink, a co-solvent system present in a total amount ranging from about 12 wt % to about 25 wt % based on the total weight of the ink, the co-solvent system consisting of glycerol present in an amount ranging from about 9 wt % to about 20 wt % based on the total weight of the ink, ethoxylated glycerol present in an amount ranging from 0 wt % to about 5 wt % based on the total weight of the ink, and a water soluble or water miscible organic solvent present in an amount ranging from 0 wt % to about 7 wt % based on the total weight of the ink, an additive selected from the group consisting of a surfactant, a chelating agent, a buffer, a biocide, and combinations thereof; and a balance of water. While the system 30 has been described with thermal inkjet printheads, it is to be understood that the inkjet pre-treatment fluid 23 may be dispensed from a piezoelectric printhead.

As shown in FIG. 6, the system 30 includes least two inkjet printers 29, 32 (one in a pre-treatment zone 31 and the other in a printing zone 34), a dryer 35 positioned in an ink layer drying zone 41, and a dryer 36 positioned in a sublimation zone 38. The system 30 may also include one inkjet printer with separate inkjet printheads 10 for printing the pre-treatment fluid 23 and the ink 24.

In one example, a textile substrate 33 may be transported through the printing system 30 along the path shown by the arrows such that the textile substrate 33 is first fed to the pre-treatment zone 31 where an example of the pre-treatment fluid 23 disclosed herein is inkjet printed directly onto the textile substrate 33 by the inkjet printer 29 (for example, from either the thermal or piezoelectric printheads 10 as described above) to form a pre-treated area on the textile substrate 33.

Some examples of the system 30 further include a dryer 43 positioned in a pre-treated area drying zone 45. If desired, the textile substrate 33 having the pre-treatment fluid 23 applied thereon may be exposed to drying as previously described to form a dried pre-treated area.

The textile substrate having the pre-treated area or the dried pre-treated area is then transferred to the printing zone 34, where an example of the thermal inkjet dye sublimation ink 24 disclosed herein is inkjet printed directly onto the pre-treated area or the dried pre-treated area of the textile substrate 33 by the thermal inkjet printer 32 (for example, from the thermal inkjet printhead 10 as described above) to form an ink layer on the pre-treated area or the dried pre-treated area of the textile substrate 33.

The ink layer disposed on the textile substrate 33 may be heated in the drying zone 41. The air temperature in the drying zone 41 may range from about 40° C. to about 90° C., such that water may be at least partially evaporated from the ink layer. As an example, at least partial evaporation means that at least 50% of the water is removed. As another example, at least 80% of the water may be removed during evaporation. Generally, it is desirable for enough water to be removed from an area so that color in the area is not transferred to an adjacent portion/facing surface of the textile substrate during/after rolling that comes in contact with the area.

The textile substrate 33 (having the dried ink layer printed thereon) may then be transported to the sublimation zone 38 where the dried ink layer is heated or heated and exposed to pressure to sublimate the dye, causing it to penetrate into the textile substrate 33. This forms the printed article 40 including the image 37 formed on the textile substrate 33.

To further illustrate the present disclosure, examples are given herein. It is to be understood that these examples are provided for illustrative purposes and are not to be construed as limiting the scope of the present disclosure.

EXAMPLES

Example 1

An example of the pre-treatment fluid (PTF) disclosed herein was prepared, and three comparative example pre-treatment fluids were prepared. The formulations for the pre-treatment fluids are shown in Table 1. The weight percentages given for the cationic polymer represent wt % actives in the pre-treatment fluid formulations.

TABLE 1

| Ingredient | Specific Component | Example PTF Amount (wt %) | Comp. 1 PTF Amount (wt %) | Comp. 2 PTF Amount (wt %) | Comp. 3 PTF Amount (wt %) |
|---|---|---|---|---|---|
| Solvent | Glycerol | 20 | 20 | 20 | 20 |
| Surfactant | TERGITOL ® 15-S-7 | 0.95 | 0.95 | 0.95 | 0.95 |
| Fixing Additive | Poly quaternium compounds | 2.45 | N/A | N/A | N/A |
|  | Succinic acid | N/A | 4 | N/A | N/A |
|  | Calcium nitrate | N/A | N/A | 4 | 6 |
| Water |  | Balance | Balance | Balance | Balance |

Example black, cyan, magenta, and yellow dye sublimation inks were also prepared. All of the ink formulations are shown in Table 2. The weight percentages given for the dye dispersion and the chelating agent represent wt % actives in the ink formulations.

TABLE 2

| Ingredient | Specific Component | Black Ink Amount (wt %) | Cyan Ink Amount (wt %) | Magenta Ink Amount (wt %) | Yellow Ink Amount (wt %) |
|---|---|---|---|---|---|
| Dye Dispersion | Black dye dispersion | 5 | N/A | N/A | N/A |
|  | Cyan dye dispersion | N/A | 5 | N/A | N/A |
|  | Magenta dye dispersion | N/A | N/A | 5 | N/A |
|  | Yellow dye dispersion | N/A | N/A | N/A | 5 |
| Solvent | Glycerol | 20 | 20 | 20 | 20 |
| Surfactant | SURYNOL ® 465 | 0.5 | 0.5 | 0.5 | 0.5 |
| Chelating Agent | TRILON ® M | 0.04 | 0.04 | 0.04 | 0.04 |
| Buffer | TRIS | 0.1 | 0.1 | 0.1 | 0.1 |
| Water |  | Balance | Balance | Balance | Balance |

Three different textile substrates were used: Aberdeen 8100-60 (uncoated, heavy banner), Aberdeen 6243-60 (uncoated, soft knit), and Aberdeen 6243-60-C38 (soft knit treated for direct dye sublimation inks).

Each of the example and comparative pre-treatment fluids was jetted onto each of the textile media at 0.75 drops of 12 ng per 600 dpi×600 dpi pixel to form a pre-treated area, and then each of the inks was jetted at 3 drops of 12 ng per 600 dpi×600 dpi pixel in 2 passes (1.5 drops/pass) onto the pre-treated areas. In this example, the pre-treated areas were not dried before the inks were printed thereon. After the inks were printed, the ink layers were dried for about 30 seconds under the following conditions: platen temperature at about 40° C. and drying temperature at about 60° C. After printing, all of the dried ink layers were heat-treated using a clamshell heater to fix the respective ink on the respective textile substrate. Sublimation took place under the following conditions: temperature at about 202° C., pressure (a.u.) at about 4, and residence time of about 30 seconds.

The gamut of the prints was visually assessed compared to an un-treated control of the same media. The results are shown in Tables 3 and 4. The ratings in tables 3 and 4 are as follows: (−) slightly worse than the control (having no pre-treatment), (=) similar to the control, and (+) slightly better than the control.

TABLE 3

| Textile Sub. | Black Ink | | | | Cyan Ink | | | |
|---|---|---|---|---|---|---|---|---|
| | Example PTF | Comp. 1 PTF | Comp. 2 PTF | Comp. 3 PTF | Example PTF | Comp. 1 PTF | Comp. 2 PTF | Comp. 3 PTF |
| 8100-60 | = | = | = | = | + | = | − | − |
| 6243-60 | − | − | − | − | + | + | + | − |
| 6243-60-C38 | = | = | = | = | + | + | + | + |

TABLE 4

| Textile Sub. | Magenta Ink | | | | Yellow Ink | | | |
|---|---|---|---|---|---|---|---|---|
| | Example PTF | Comp. 1 PTF | Comp. 2 PTF | Comp. 3 PTF | Example PTF | Comp. 1 PTF | Comp. 2 PTF | Comp. 3 PTF |
| 8100-60 | = | = | = | = | = | = | + | + |
| 6243-60 | = | = | = | = | = | = | = | = |
| 6243-60-C38 | = | = | = | = | = | = | = | = |

Overall, the example and comparative pre-treatment fluids on the uncoated textiles (8100-60 and 6243-60) showed partial bleed and wicking improvement compared to the respective no pre-treatment controls. The example and comparative pre-treatment fluids on the coated textiles (6243-60-C38) showed improved or comparable bleed and wicking compared to the respective no pre-treatment controls. In this example, it is believed that the relatively poor performance of the example pre-treatment fluid with the black ink may be due to the drying conditions. As shown in Example 2, drying improved the performance.

Example 2

The example and comparative pre-treatment fluids and example inks from Example 1 were used.

Each of the example and comparative pre-treatment fluids was jetted onto each of the textile media at 0.75 drops of 12 ng per 600 dpi×600 dpi pixel to form a pre-treated area. After the pre-treatment fluids were printed, the pre-treated areas were dried for about 30 seconds under the following conditions: platen temperature at about 40° C. and drying temperature at about 60° C.

Then each of the inks was jetted at 3 drops of 12 ng per 600 dpi×600 dpi pixel in 2 passes (1.5 drops/pass) onto the dried pre-treated areas. The total number of passes was varied from 2 to 4. After the inks were printed, the ink layers were dried for about 30 seconds under the following conditions: platen temperature at about 40° C. and drying temperature at about 60° C. After printing, all of the dried ink layers were heat-treated using a clamshell heater to fix the respective ink on the respective textile substrate. Sublimation took place under the following conditions: temperature at about 202° C., pressure (a.u.) at about 4, and residence time of about 30 seconds.

Following sublimation, it was observed that the comparative pre-treatment fluids significantly yellowed each of the textile substrates, while the example pre-treatment fluid did not.

The prints, and the un-treated control of the same media, were visually assessed in terms of ink absorption and bleed control. Each of the prints was ranked on a scale of 1-5 (1: worst, 5: best) and the results for all of the different colored prints were averaged. The averaged values are summarized in Table 5 (bleed control) and Table 6 (ink absorption).

TABLE 5

BLEED CONTROL

| Textile Substrate and Number of Passes | Control or Pre-treatment Fluid | | | | |
|---|---|---|---|---|---|
| | Specific Control | Example PTF | Comp. 1 PTF | Comp. 2 PTF | Comp. 3 PTF |
| 8100-60 | | | | | |
| 2 passes | 2.5 | 2 | 1.5 | 2 | 2.5 |
| 3 passes | 2.5 | 2.5 | 2.5 | 3 | 2.5 |
| 4 passes | 2 | 3 | 3 | 3 | 3 |
| 6243-60 | | | | | |
| 2 passes | 2.5 | 2 | 3 | 2.5 | 2.5 |
| 3 passes | 3 | 3 | 3 | 3 | 3 |
| 4 passes | 3 | 3.5 | 3 | 3 | 3.5 |

TABLE 5-continued

BLEED CONTROL

| Textile Substrate and Number of Passes | Control or Pre-treatment Fluid | | | | |
|---|---|---|---|---|---|
| | Specific Control | Example PTF | Comp. 1 PTF | Comp. 2 PTF | Comp. 3 PTF |
| 6243-60-C38 | | | | | |
| 2 passes | 3 | 3 | 3 | 3 | 3 |
| 3 passes | 3 | 4 | 3 | 3.5 | 4 |
| 4 passes | 3 | 4 | 3.5 | 3.5 | 3 |

TABLE 6

INK ABSORPTION

| Textile Substrate and Number of Passes | Control or Pre-treatment Fluid | | | | |
|---|---|---|---|---|---|
| | Specific Control | Example PTF | Comp. 1 PTF | Comp. 2 PTF | Comp. 3 PTF |
| 8100-60 | | | | | |
| 2 passes | 2 | 2 | 2.5 | 1.5 | 1.5 |
| 3 passes | 1 | 2.5 | 3 | 2.5 | 1.5 |
| 4 passes | 1 | 3 | 2.5 | 3 | 3 |
| 6243-60 | | | | | |
| 2 passes | 0 | 2.5 | 1 | 1.5 | 2 |
| 3 passes | 0 | 3 | 1.5 | 2 | 2 |
| 4 passes | 0 | 4 | 2 | 3 | 3 |
| 6243-60-C38 | | | | | |
| 2 passes | 3 | 3 | 2.5 | 2.5 | 2.5 |
| 3 passes | 3 | 3 | 3 | 3 | 2.5 |
| 4 passes | 3 | 3.5 | 3 | 3 | 3 |

The example pre-treatment was found to be more effective with a higher number of passes, and generally was comparable to or improved the ink absorption and bleed. The example pre-treatment also generally performed better than the comparative pre-treatment fluid in terms of ink absorption.

Figure 7A:
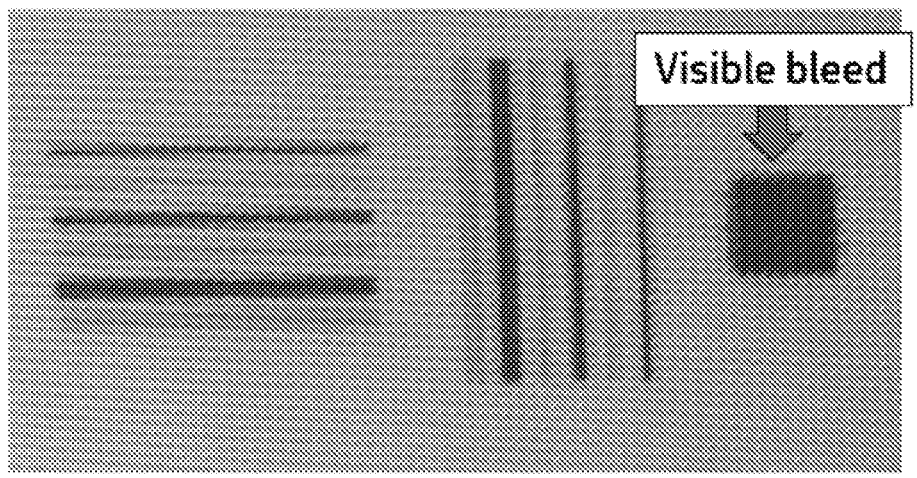
FIGS. 7A and 7B are black and white reproductions of originally colored photographs of a comparative print which did not include any pre-treatment fluid (FIG. 7A) and of an example print which included an example of the pre-treatment fluid disclosed herein (FIG. 7B).
Figure 7B:
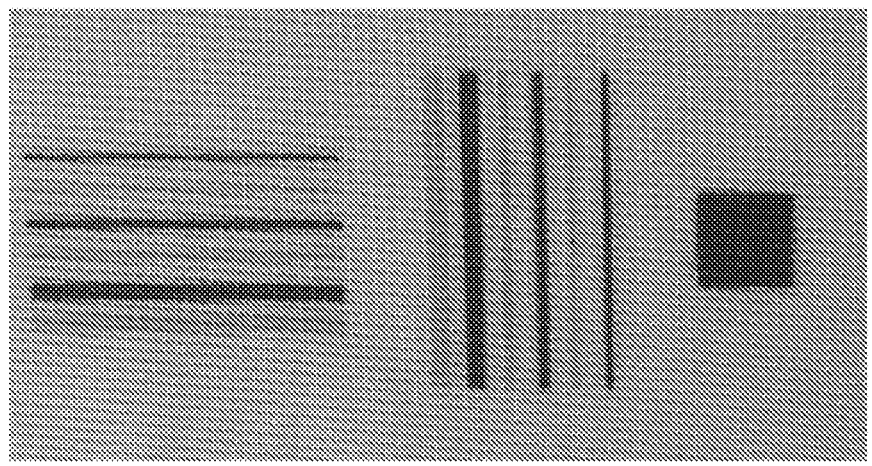

FIGS. 7A and 7B are black and white representations of originally colored photographs of a comparative print and an example print. These images were printed with the yellow and magenta inks on the 8100-60 textile medium. FIG. 7A illustrates the inks printed with no pre-treatment fluid. The bleed was clearly visible. FIG. 7B illustrates the ink printed with the example pre-treatment fluid. Clearly, bleed was improved.

It is to be understood that the ranges provided herein include the stated range and any value or sub-range within the stated range. For example, a range from about 12 wt % to about 20 wt % should be interpreted to include not only the explicitly recited limits of from about 12 wt % to about 20 wt %, but also to include individual values, such as 13 wt %, 17 wt %, 19.5 wt %, etc., and sub-ranges, such as from about 15 wt % to about 19 wt %, from about 14 wt % to about 28 wt %, from about 15.5 wt % to about 20 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A printing method, comprising:
   inkjet printing, from an inkjet printhead, a colorless inkjet pre-treatment fluid onto a textile substrate to form a pre-treated area on the textile substrate, the colorless inkjet pre-treatment fluid including:
      a humectant;
      a cationic polymer;
      a surfactant;
      a co-solvent present in an amount up to about 50 wt % based on a total weight of the inkjet pre-treatment fluid; and
      a balance of water;
   thermal inkjet printing, from a thermal inkjet printhead, a dye sublimation ink onto the pre-treated area to form an ink layer on the textile substrate, the dye sublimation ink including:
      a disperse dye colorant dispersion present in an amount ranging from about 1 wt % actives to about 7 wt % actives based on a total weight of the dye sublimation ink;
      a co-solvent system present in a total amount ranging from about 12 wt % to about 25 wt % based on the total weight of the ink, the co-solvent system consisting of:
         glycerol present in an amount ranging from about 9 wt % to about 20 wt % based on the total weight of the ink;
         ethoxylated glycerol present in an amount ranging from 0 wt % to about 5 wt % based on the total weight of the ink; and
         a water soluble or water miscible organic solvent present in an amount ranging from 0 wt % to about 7 wt % based on the total weight of the ink;
      an additive selected from the group consisting of a surfactant, a chelating agent, a buffer, a biocide, and combinations thereof; and
      a balance of water;
   drying the ink layer on the textile substrate; and
   exposing the dried ink layer on the textile substrate to a post-treatment process involving at least heat to form an image on the textile substrate.

2. The printing method as defined in claim 1 wherein prior to thermal inkjet printing the dye sublimation ink, the method further comprises exposing the pre-treated area on the textile substrate to drying to form a dried pre-treated area on the textile substrate, and wherein the dye sublimation ink is printed on the dried pre-treated area to form the ink layer on the textile substrate.

3. The printing method as defined in claim 2 wherein exposing the pre-treated area on the textile substrate to drying involves a drying temperature ranging from about 40° C. to about 90° C. and a drying time ranging from about 10 seconds to about 120 seconds.

4. The printing method as defined in claim 1 wherein the textile fabric is an uncoated polyester, a coated polyester, a polyester blend, or a nylon.

5. The printing method as defined in claim 1 wherein the post-treatment process involves heating the dried ink layer on the textile substrate to a temperature ranging from about 182° C. to about 215° C., and exposing the dried ink layer on the textile substrate to pressure ranging from 0 psi to about 100 psi.

6. The printing method as defined in claim 1 wherein thermal inkjet printing the dye sublimation ink involves applying to a heating resistor of the thermal inkjet printhead an operating energy that includes a margin over a turn-on energy (TOE) for the other printhead, wherein the margin ranges from about 10% to about 25% over the TOE.

7. The printing method as defined in claim 1 wherein the dye sublimation ink includes:
   the chelating agent selected from the group consisting of methylglycinediacetic acid, trisodium salt; 4,5-dihydroxy-1,3-benzenedisulfonic acid disodium salt monohydrate; ethylenediaminetetraacetic acid; hexamethylenediamine tetra(methylene phosphonic acid), potassium salt; and combinations thereof; and
   the surfactant selected from the group consisting of oleth-3-phosphate, ethoxylated 2,4,7,9-tetramethyl 5 decyn-4,7-diol, and combinations thereof.

8. The inkjet printing method as defined in claim 1 wherein the surfactant in the colorless inkjet pre-treatment fluid is a zwitterionic surfactant.

9. The inkjet printing method as defined in claim 1 wherein the cationic polymer in the colorless inkjet pre-treatment fluid is selected from the group consisting of polyamines, poly quaternium compounds, polyallylamine, polyallylamine sulfate, polyallylamine hydrochloride, allylamine/diallylamine copolymer, allylamine/diallylamine copolymer sulfate, allylamine/diallylamine copolymer hydrochloride, allylamine/dimethylallylamine, allylamine/dimethylallylamine copolymer sulfate, allylamine/dimethylallylamine copolymer hydrochloride, diallylamine, diallylamine sulfate, diallylamine hydrochloride, methyldiallylamine amide, methyldiallylamine amide sulfate, methyldiallylamine amide hydrochloride, diallylamine sulfur dioxide copolymer, diallylamine sulfur dioxide copolymer sulfate, diallylamine sulfur dioxide copolymer hydrochloride, methyl diallylamine sulfur dioxide copolymer, methyldiallylamine sulfur dioxide copolymer sulfate, methyldiallylamine sulfur dioxide copolymer hydrochloride, polyguanadine, polyethyleneimine, and combinations thereof.

10. The inkjet printing method as defined in claim 1 wherein the cationic polymer in the colorless inkjet pre-treatment fluid is present in an amount ranging from about 1 wt % actives to about 5 wt % actives based on a total weight of the colorless inkjet pre-treatment fluid.

11. An inkjet printing system, comprising:
    at least two inkjet printheads, each of the printheads including:
       a base substrate;
       an other substrate defined on the base substrate, the other substrate having defined therein at least one fluid feed opening and at least one fluid chamber, wherein the at least one fluid feed opening is in operative and fluid communication with the at least one fluid chamber and with a fluid channel to supply a fluid thereto;
       a nozzle plate disposed on a portion of the other substrate, the nozzle plate having at least one orifice defined therein, the at least one orifice being in fluid communication with the at least one fluid chamber; and a firing element operatively disposed on the base substrate and proximate to, and operatively associated with the at least one fluid chamber and the at least one orifice;

wherein a first of the inkjet printheads is a thermal inkjet printhead or a piezoelectric inkjet printhead containing a colorless inkjet pre-treatment fluid, including:
a humectant;
a cationic polymer;
a surfactant;
a co-solvent present in an amount up to about 50 wt % based on a total weight of the inkjet pre-treatment fluid; and
a balance of water; and wherein a second of the inkjet printheads is a thermal inkjet printhead containing a dye sublimation ink, including:
a disperse dye colorant dispersion present in an amount ranging from about 1 wt % actives to about 7 wt % actives based on a total weight of the dye sublimation ink;
a co-solvent system present in a total amount ranging from about 12 wt % to about 25 wt % based on the total weight of the ink, the co-solvent system consisting of:
glycerol present in an amount ranging from about 9 wt % to about 20 wt % based on the total weight of the ink;
ethoxylated glycerol present in an amount ranging from 0 wt % to about 5 wt % based on the total weight of the ink; and
a water soluble or water miscible organic solvent present in an amount ranging from 0 wt % to about 7 wt % based on the total weight of the ink;
an additive selected from the group consisting of a surfactant, a chelating agent, a buffer, a biocide, and combinations thereof; and
a balance of water.

12. The inkjet printing system as defined in claim 11 wherein the humectant in the colorless inkjet pre-treatment fluid is glycerol and is present in an amount ranging from about 12 wt % to about 20 wt % based on the total weight of the colorless inkjet pre-treatment fluid.

13. The inkjet printing system as defined in claim 11 wherein the cationic polymer in the colorless inkjet pre-treatment fluid is selected from the group consisting of polyamines, poly quaternium compounds, polyallylamine, polyallylamine sulfate, polyallylamine hydrochloride, allylamine/diallylamine copolymer, allylamine/diallylamine copolymer sulfate, allylamine/diallylamine copolymer hydrochloride, allylamine/dimethylallylamine, allylamine/dimethylallylamine copolymer sulfate, allylamine/dimethylallylamine copolymer hydrochloride, diallylamine, diallylamine sulfate, diallylamine hydrochloride, methyldiallylamine amide, methyldiallylamine amide sulfate, methyldiallylamine amide hydrochloride, diallylamine sulfur dioxide copolymer, diallylamine sulfur dioxide copolymer sulfate, diallylamine sulfur dioxide copolymer hydrochloride, methyl diallylamine sulfur dioxide copolymer, methyldiallylamine sulfur dioxide copolymer sulfate, methyldiallylamine sulfur dioxide copolymer hydrochloride, polyguanadine, polyethyleneimine, and combinations thereof.

14. The inkjet printing system as defined in claim 11 wherein the cationic polymer in the colorless inkjet pre-treatment fluid is present in an amount ranging from about 1 wt % actives to about 5 wt % actives based on a total weight of the colorless inkjet pre-treatment fluid.

15. The inkjet printing system as defined in claim 11 wherein:
the cationic polymer in the colorless inkjet pre-treatment fluid is present in an amount ranging from about 2 wt % actives to about 3 wt % actives based on the total weight of the colorless inkjet pre-treatment fluid; and
the surfactant in the colorless inkjet pre-treatment fluid is present in an amount ranging from about 0.5 wt % to about 1 wt % based on the total weight of the colorless inkjet pre-treatment fluid.

16. The inkjet printing system as defined in claim 11 wherein the surfactant in the colorless inkjet pre-treatment fluid is selected from the group consisting of a non-ionic surfactant, a cationic surfactant, and a zwitterionic surfactant.

17. The inkjet printing system as defined in claim 11, further comprising a printhead controller, operatively connected to the firing element of the second of the inkjet printheads, to activate an electrical current to pass the electrical current through the firing element to apply an operating energy that includes a margin over a turn-on energy (TOE) for the printhead, wherein the margin ranges from about 10% to about 25% over the TOE.

* * * * *